Patented June 6, 1933

1,913,346

UNITED STATES PATENT OFFICE

HUGH R. STILES, OF TERRE HAUTE, INDIANA, ASSIGNOR TO COMMERCIAL SOLVENTS CORPORATION, OF TERRE HAUTE, INDIANA, A CORPORATION OF MARYLAND

PRODUCTION OF ALIPHATIC ACIDS

No Drawing. Application filed November 25, 1929. Serial No. 409,757.

My invention relates to a process for the production of volatile aliphatic acids by fermentation. More specifically, my invention relates to a process for the production of a mixture of acetic, propionic, and butyric acids by the fermentation of carbohydrates or salts of organic acids.

A number of processes dealing with the production of acetic, propionic and butyric acids by fermentation have been suggested in the past. For example, butyric acid has been produced by the fermentation of a carbohydrate medium by means of organisms of the type of Bacillus saccharabutyricum liquifaciens. A mixture consisting of acetic and butyric acids is obtained by the fermentation of cellulosic matter with thermophilic bacteria by the so-called Langwell process (U. S. Patent 1,602,306). It has been the custom in the past to produce a mixture of propionic and acetic acids by the fermentation of solutions of carbohydrates, lactates or other fermentable organic salts by means of propionic acid-forming organisms. All of these processes, however, have certain inherent disadvantages from a commercial standpoint, principally in that long periods of time are required to complete a particular fermentation and in addition the yields obtained are considerably lower than the theoretical based upon the raw material used. My new process overcomes these difficulties experienced by previous investigators and provides a practical method of obtaining acetic, propionic and butyric acids from carbohydrates or other suitable fermentable materials, which is quicker and generally more efficient than former processes.

My invention consists essentially in fermenting a mash containing carbohydrates, lactates, or other fermentable organic salts by the aid of a propionic acid-forming organism in the presence of lactic acid-forming organisms and butyric acid-forming organisms, whereby increased yields of acids are obtained, and the fermentation is completed in a fraction of the time required by either propionic or butyric organisms operating separately or by the combined action of lactic and propionic organisms.

A number of microorganisms have been recommended as propionic acid producers but the most suitable of these appears to be *Bacterium acidi propionici*, an organism isolated from Swiss cheese. Such organisms usually produce propionic acid and acetic acid, the former being present in the fermented mash to the extent of about 60% and the latter 40% of the total volatile acids. Fermentation by the aid of these organisms alone, however, is extremely slow, and as a result, it has been the custom in the past to use with the propionic acid bacteria, organisms of another character known as "accelerator" organisms. These accelerating organisms which serve to markedly decrease the length of time necessary to complete a propionic acid fermentation are substantially included in the following classes, but this statement is not to be construed as limiting the operating of this invention to the use of organisms of the classes specifically named:

1. These organisms which produce lactic acid from carbohydrates, as for example, those described on pages 241–255 of Bergey's Manual of Determinative Bacteriology (1923 edition);

2. Organisms which hydrolyze nitrogenous substances and form therefrom new materials which can be acted upon by other bacteria, such as the members of the proteus group (pages 209–211 of Bergey's Manual of Determinative Bacteriology);

3. Organisms which do not fall into either of the preceding groups but which ferment salts of organic acids such as the members of the alcaligines group (pages 233–237 of Bergey's Manual of Determinative Bacteriology).

As the butyric acid-forming organism I may use *Bacillus saccharobutyricum liquifiens*, *Clostridium acetobutylicum* or other butyric acid-forming organisms such as those listed on pages 320–321 of Bergey's Manual of Determinative Bacteriology. It is to be understood that by the term "butyric acid-producing organisms", I do not wish to limit myself to the "true butyrics", but wish to include all organisms which produce butyric acids.

The material to be fermented may consist of carbohydrates such as glucose, sucrose, hydrolyzed corn starch, molasses, corn syrup, "hydrol", wood sugars, etc., or salts of organic acids such as lactates, citrates, tartrates or malates. Most of these forms of carbohydrate material are deficient in nitrogen and other nutrient material essential to bacterial growth. In a purely saccharine medium such as presented by a glucose solution, or a starch medium, nitrogenous matter is absent, whereas in commercial or "black strap" molasses the nitrogenous materials required by the bacteria are sometimes, but not always, present. The nitrogen required as a nutrient in carrying out my fermentation may be supplied in the form of any nitrogenous compounds which are non-toxic and are available to the organisms, such as, for example, ammonium sulfate, the "slop" or distillery residue obtained in the butyl-acetonic fermentation industry after the removal of the butyl alcohol, acetone and ethyl alcohol formed in the process, yeast water, "degraded" yeast, "steep water", etc.

My invention may best be illustrated by citing a specific example. It will be obvious, however, that the operation described may be varied in a number of ways, and accordingly it is to be distinctly understood that my invention is limited in no way to such specific procedure.

*Example*

Ten per cent of "black strap" molasses is added to butyl-acetonic slop. After sterilizing, the resulting mixture is inoculated and allowed to ferment at temperatures ranging from about 20° C. to about 38° C., but preferably in the neighborhood of 30° C. The inoculum consists preferably of approximately 94% of propionic acid bacteria such as *Bacterium acidi propionici*, approximately 5% of lactic acid bacteria such as *Lactobacillus casei*, and approximately 1% of butyric acid bacteria such as *Clostridium acetobutylicum*. The butyric organisms or the lactic organisms, or both, may be introduced into the propionic fermentation as an additional inoculum, or they may be introduced by having them growing in the same culture with the inoculating propionic organisms.

It has been found that, in general, organisms which produce acids during the course of a fermentation become less and less active as the concentration of the acid in the medium increases. Such a condition is met with in the present case. In order to obtain the maximum yields, it is necessary to prevent the medium from becoming too acid by introducing an excess of calcite ($CaCO_3$) or other insoluble alkaline earth compound into the fermenting medium. Or, if preferred, smaller additions may be made each day instead of all at one time. In either case, thorough agitation should be resorted to at frequent intervals. If desired, the acids may be neutralized by alkaline materials such as sodium hydroxide, sodium bicarbonate, sodium carbonate or ammonia in place of calcium carbonate. In this case, however, it is necessary to add the neutralizing agent at more frequent intervals in order to prevent making the medium too alkaline, it being highly desirable to control the acidity of the medium so that the hydrogen ion concentration is maintained preferably within the limits of approximately $pH=4.6$ to approximately $pH=7.0$. I prefer to use an excess of calcite as the neutralizing agent, thus maintaining a pH of approximately 5.2 to 5.4 throughout the fermentation.

In certain cases it is found advantageous also to add to the fermenting mash sufficient finely divided inert matter such as kieselguhr, coke, etc., to occupy one-fourth to one-half of the volume of the fermenting liquor. This inert material then acts as a support for the bacteria so that when a fermentation has proceeded substantially to completion, the clear upper liquor may be removed and new carbohydrate added to the residue which contains the greater portion of the bacteria, thus serving as the inoculum for a new fermentation and appreciably lessening the length of time required to complete subsequent fermentations. While the amount of fermented liquor withdrawn at the end of each operation naturally varies with the requirements of each particular case and the amount of inert bacteria support employed, I have found that the removal of only one-half of the fermented material at the end of each cycle gives excellent results.

The following table shows results obtained by the procedure outlined above. The results shown were obtained by carrying out fermentations in butyl-acetonic slop containing 10% molasses and a quantity of calcite 5% in excess of the calculated amount necessary to neutralize the acids formed.

*Table*

| Fermentation No. | Culture | Days old | Volatile acid | Indicated butyric acid produced |
|---|---|---|---|---|
|  |  |  | % | % of total volatile acids |
| 1 | Lactic and propionic bacteria | 7 | 2.98 | nil |
| 2 | Lactic, propionic and butyric acid bacteria | 4 | 3.10 | 5 |
| 3 | Lactic, propionic and butyric acid bacteria | 6 | 3.66 | 5-8 |
| 4 | Lactic, propionic and butyric acid bacteria | 6 | 3.61 | 5-8 |
| 5 | Lactic, propionic and butyric acid bacteria | 5 | 2.70 | 20-30 |
| 6 | Lactic, propionic and butyric acid bacteria | 5 | 3.66 | 6-10 |
| 7 | Lactic, propionic and butyric acid bacteria | 5 | 3.63 | 8-15 |

I have found that the best yields of total volatile acids are produced when the conditions of the fermentation are maintained such that the proportion of butyric acid formed is relatively low, as for example, approximately 5% of the total volatile acids. Thus, in order to obtain the optimal results, the conditions of the fermentation should be controlled such that the volatile acids produced are approximately in the following proportions: propionic 45–70%, acetic 30–40%, and butyric 1–10%. I have found that by limiting the number of butyric acid-forming organisms present at any time to a small proportion of the total number of organisms present, the acids are produced in approximately this ratio. In general, an inoculum of approximately 0.1%–3.0% butyric acid bacteria, 1%–10% lactic acid bacteria, and 87%–98% propionic acid bacteria will cause the acids to be produced in approximately these proportions. However, it is well known that the butyric acid bacteria multiply much more rapidly than the propionic acid bacteria under certain conditions, so it is essential that the fermentation conditions be controlled so as to inhibit somewhat the butyric acid organisms and thus maintain their concentration at less than 10% of the total number of organisms present.

It has long been known to those familiar with the art that fermentation conditions may be controlled so as to favor or to inhibit one organism or one group of organisms in a mixed culture. For years bacteriologists have used this principle in the purification of cultures by the so-called "enrichment method" in which selective culture media and selective fermentation conditions are utilized to favor one organism over all others present. Likewise, selective conditions have been utilized to inhibit one organism or one type of organism. For example, in the isolation of yeasts the hydrogen ion concentration is maintained at a sufficiently low pH so as to inhibit the bacteria which may be present, and in making "plate counts" from dairy products, sodium caseinate is incorporated in the medium to inhibit the "spreader" type of bacteria.

The same principle is applied in my invention. By controlling the fermentation conditions such as temperature, hydrogen ion concentration, concentration of the carbohydrate and nutrients, concentration of inert materials, concentration of toxic materials, etc., or any one or more of such conditions, the butyric acid organisms may be inhibited to the point where they constitute only a small fraction of the total number of organisms present. In a complex mixture such as the butanol-acetonic slop or the "black-strap" molasses used in this fermentation, there are present inert materials such as carbohydrates or nitrogenous substances as well as a certain amount of mineral matter which the organisms are unable to utilize; these substances, although inert chemically with respect to the organisms, may cause selective conditions due to the osmotic pressure, surface tension, etc., which they maintain in the liquid. Also, there are always present certain toxic substances of unknown composition. This has been demonstrated in the case of black-strap molasses by the failure in certain cases to obtain fermentation with known sucrose fermenting organisms. Thus, the concentrations of these inert and toxic materials may be controlled by varying the concentrations of the raw materials, or by the addition of specific inert substances such as an unfermentable carbohydrate, a soap, etc., to control the osmotic pressure or the surface tension, and by the addition of substances which have a specific rather than a general toxic action. Many specific toxic agents have been used in fermentations, as, for example, crystal violet, sodium ricinoleate, iron salts, etc.

It is essential that the fermentation conditions be controlled by these means in order to obtain the desired ratio of products, but of course, as is well known to those familiar with the art, the choice of any one or more of these conditions will depend entirely upon the particular strains of the three types of organisms chosen as the inocula for the fermentation.

The products of the fermentation are recovered as the salts of the metallic compound used as the neutralizing agent. These salts may be separated and/or the acids recovered therefrom by the usual methods. In the latter case the mixture of the acids obtained may be used as such, or the acids may be separated by the usual methods.

A possible explanation for the increased yield of volatile acids when carrying out the fermentation substantially as above disclosed is that the atomic hydrogen given off by the butyric acid bacteria establishes a strong reducing condition in the fermenting mash which is favorable for the reduction of lactic to propionic acid. It is to be distinctly understood, however, that my invention is not to be construed as being based entirely upon this theory.

Now having described my invention, what I claim is:

1. A process for the production of volatile aliphatic acids which comprises fermenting carbohydrates by the aid of a mixed culture containing propionic acid bacteria, lactic acid bacteria and butyric acid bacteria.

2. A process for the production of volatile aliphatic acids which comprises fermenting carbohydrates by the aid of an inoculum containing 0.1%–3% butyric acid bacteria, 1%–10% lactic acid bateria and 87%–98% propionic acid bacteria.

3. A process for the production of volatile aliphatic acids which comprises inoculating a carbohydrate mash with a mixed culture containing propionic, lactic, and butyric acid forming organisms, and allowing fermentation to proceed while maintaining the hydrogen ion concentration within the limits of pH=4.6 and pH=7.0, as measured in the bulk of the fermenting mash.

4. A process for the production of volatile aliphatic acids which comprises inoculating a carbohydrate mash with a mixed culture containing propionic, lactic, and butyric acid-forming organisms, and allowing fermentation to proceed while maintaining the hydrogen ion concentration within the limits of pH=4.6 and pH=7.0, as measured in the bulk of the fermenting mash, by adding a neutralizing agent selected from the group comprising calcite, soda ash, sodium carbonate, sodium bicarbonate, and ammonia.

5. A process for the production of volatile aliphatic acids which comprises inoculating a carbohydrate mash with a mixed culture containing propionic, lactice, and butyric acid forming organisms, and allowing fermentation to proceed while maintaining the hydrogen ion concentration at approximately pH 5.3, as measured in the bulk of the fermenting mash by means of calcite.

6. A process for the production of volatile aliphatic acids which comprises inoculating a carbohydrate mash with a mixed culture containing propionic, lactic and butyric acid forming organisms, and allowing fermentation to proceed at temperatures ranging from 20° C. to 38° C.

7. A process for the production of volatile aliphatic acids which comprises inoculating a carbohydrate mash with a mixed culture containing propionic, lactic and butyric acid forming organisms, and allowing fermentation to proceed at a temperature of approximately 30° C.

8. A process for the production of volatile aliphatic acids which comprises inoculating a carbohydrate mash with a mixed culture containing propionic, lactic and butyric acid forming organisms, and allowing fermentation to proceed at a temperature ranging from 20° C. to 38° C. while maintaining the hydrogen ion concentration within the limits of pH=4.6 and pH=7.0, and recovering the acids thus formed.

9. A process for the production of volatile aliphatic acids which comprises inoculating a carbohydrate mash with a mixed culture comprising 0.1%–3.0% butyric acid forming organisms, 1%–10% lactic acid forming organisms, and 87% to 98% propionic acid forming organisms, allowing the fermentation to proceed at a temperature ranging from 20° C. to 38° C. while maintaining the hydrogen ion concentration within the limits of pH=4.6 and pH=7.0, and recovering the acids thus formed.

10. A process for the production of volatile aliphatic acids which comprises inoculating a carbohydrate mash with a mixed culture comprising *Bacterium acidi propionici*, *Lactobacillus casei*, and *Clostridium acetobutylicum*, allowing fermentation to proceed at a temperature ranging from 20° C. to 38° C. while maintaining the hydrogen ion concentration within the limits of pH=4.6 and pH=7.0, and recovering the acids thus formed.

11. A process for the production of volatile aliphatic acids which comprises inoculating a carbohydrate mash containing butyl-acetonic slop and soluble carbohydrate material with a mixed culture containing propionic, lactic and butyric acid forming organisms, allowing fermentation to proceed at a temperature ranging from 20° C. to 38° C. while maintaining the hydrogen ion concentration within the limits of pH=4.6 and pH=7.0, and recovering the acids thus formed.

12. In a process for the production of volatile aliphatic acids by the fermentation of carbohydrates by a mixed culture containing propionic acid forming organisms and lactic acid forming organisms, the step which comprises accelerating fermentation by including butyric acid forming organisms in the inoculum used to promote fermentation.

13. In a process for the production of volatile aliphatic acids by the fermentation of carbohydrates by a mixed culture containing propionic acid forming organisms and lactic acid forming organisms, the step which comprises accelerating fermentation by introducing into the fermenting mash an inoculum of butyric acid forming organisms comprising less than 10% of the total number of bacteria present.

14. In a process for the production of volatile aliphatic acids by the fermentation of carbohydrates, by aid of a mixture containing propionic acid forming organisms, lactic acid forming organisms, and butyric acid forming organisms, the step which comprises controlling the fermentation conditions to limit the number of butyric acid forming organisms present at any time to less than 10% of the total number present.

15. A process for the production of volatile aliphatic acids which comprises fermenting molasses by the aid of a mixed culture containing propionic acid bacteria, lactic acid bacteria, and butyric acid bacteria.

16. In a process for the production of volatile aliphatic acids by fermentation, the step which comprises inoculating with a mixed culture containing propionic acid bacteria, lactic acid bacteria and butyric acid bacteria a fermentable mash which is suitable for the production of propionic acid by the aid of propionic acid bacteria.

17. In a process for the production of volatile aliphatic acids by fermentation, the step which comprises inoculating with a mixed culture containing propionic acid bacteria, butyric acid bacteria and bacteria selected from the group consisting of organisms of the Lactic, Proteus and Alcalingines types a fermentable mash which is suitable for the production of propionic acid by the aid of propionic acid bacteria.

18. In a process for the production of volatile aliphatic acids by fermentation with a mixed culture containing propionic acid bacteria and lactic acid bacteria, the step which comprises accelerating the fermentation by introducing into the mash an inoculum of butyric acid bacteria.

19. In a process for the production of volatile aliphatic acids by fermentation with a mixed culture containing propionic acid bacteria and bacteria selected from the group consisting of organisms of the Lactic, Proteus and Alcaligines types, the step which comprises accelerating the fermentation by introducing into the mash an inoculum of butyric acid bacteria.

20. In a process for the production of volatile aliphatic acids by fermentation, the step which comprises fermenting with a mixed culture containing propionic acid bacteria, lactic acid bacteria and butyric acid bacteria, salts of organic acids which yield propionic acid by the action of propionic acid bacteria.

21. In a process for the production of volatile aliphatic acids by fermentation, the step which comprises fermenting calcium lactate by the aid of a mixed culture containing propionic acid bacteria, lactic acid bacteria and butyric acid bacteria.

In testimony whereof I affix my signature.

HUGH R. STILES.